US009667781B2

(12) United States Patent
Sinha et al.

(10) Patent No.: US 9,667,781 B2
(45) Date of Patent: May 30, 2017

(54) METHODS AND APPARATUSES TO CONVEY A LOCAL CALL HOLD STATE TO A RECIPIENT DEVICE

(71) Applicant: QUALCOMM Incorporated, San Diego, CA (US)

(72) Inventors: Abhijeet Sinha, West Bengal (IN); Nitin Sachdeva, Hyderabad (IN); Neha Goel, Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 13/867,117

(22) Filed: Apr. 21, 2013

(65) Prior Publication Data

US 2014/0315524 A1    Oct. 23, 2014

(51) Int. Cl.
  *H04M 3/42*      (2006.01)
  *H04M 3/428*     (2006.01)
  *H04W 4/16*      (2009.01)

(52) U.S. Cl.
  CPC ......... *H04M 3/428* (2013.01); *H04M 3/4288* (2013.01); *H04M 3/42246* (2013.01); *H04W 4/16* (2013.01); *H04M 3/4285* (2013.01)

(58) Field of Classification Search
  CPC ... H04M 3/428; H04M 3/4288; H04M 3/4285
  See application file for complete search history.

(56) References Cited

U.S. PATENT DOCUMENTS

| 5,710,807 | A  | * | 1/1998 | Smith | 379/114.01 |
| 6,374,102 | B1 | * | 4/2002 | Brachman | H04W 76/00 455/422.1 |
| 7,929,993 | B2 |   | 4/2011 | Nagarajan | |
| 2005/0135342 | A1 | * | 6/2005 | Kim | 370/352 |
| 2010/0182970 | A1 |   | 7/2010 | Cherian et al. | |
| 2010/0190526 | A1 |   | 7/2010 | Marks | |

(Continued)

FOREIGN PATENT DOCUMENTS

| CN | 1604661 A | 4/2005 |
| CN | 101552970 A | 10/2009 |

(Continued)

OTHER PUBLICATIONS

International Search Report and Written Opinion—PCT/US2014/034400—ISA/EPO—Jul. 15, 2014.

*Primary Examiner* — Khalid Shaheed
(74) *Attorney, Agent, or Firm* — Loza & Loza, LLP

(57) ABSTRACT

A method is provided for implementing a local call hold in a dual subscription dual active first communication device. A first voice call may be established with a second communication device via a first communication network. An indication of a second voice call may be received from a third communication device via a second communication network. The first voice call may be placed on hold by sending a call hold indicator within a regularly transmitted frame to the second communication device. The second voice call may be established with the third communication device after placing the first voice call on hold. The first voice call with the second communication device may be subsequently resumed by excluding the call hold indicator from the regularly transmitted frame to the second communication device.

36 Claims, 8 Drawing Sheets

(56) References Cited

U.S. PATENT DOCUMENTS

| | | |
|---|---|---|
| 2010/0279698 A1 | 11/2010 | Wong |
| 2012/0020325 A1* | 1/2012 | Swamy et al. ................ 370/331 |
| 2012/0182920 A1* | 7/2012 | Maeng et al. ................ 370/312 |
| 2013/0024574 A1* | 1/2013 | Lau et al. ..................... 709/227 |

FOREIGN PATENT DOCUMENTS

| | | |
|---|---|---|
| WO | 9962282 A1 | 12/1999 |
| WO | WO-2010127585 A1 | 11/2010 |

* cited by examiner

METHODS AND APPARATUSES TO CONVEY A LOCAL CALL HOLD STATE TO A RECIPIENT DEVICE

FIELD

The present disclosure pertains to communication devices with multi-network communication capabilities and local call hold capabilities.

BACKGROUND

Some mobile communication devices are now equipped with multiple wireless subscriber identity modules, allowing such devices to communicate over different communication networks. In a dual SIM dual active (DSDA) first communication device ("Phone X"), one subscription may be in active voice call (call#1) with a second communication device ("Phone Y"). During call#1 with Phone Y via a first subscriber network, Phone X may receive an incoming voice call (call#2) from a second communication device ("Phone Z") on a different second subscriber network.

In the context where the first subscriber network and second subscriber network are different networks (e.g., implementing the same communication technology but different operators, implementing different communication technologies, etc.) there may not be away to notify the first subscriber network that call#1 has been placed on hold by Phone X. For instance, if the user of Phone X accepts the incoming call (call#2), the active call (call#1) is placed on a local hold state by Phone X, and call#2 between Phone X and Phone Z becomes active. For call#1, since it was placed in a local hold where no "HOLD" message, instruction, and/or command is sent to the first subscriber network by Phone X, then Phone Y is not informed that Phone X has placed call#1 in the local hold state. That is, while a network-initiated call hold (e.g., initiated by the first subscriber network) may permit informing Phone Y that call#1 has been placed on hold, there is no mechanism to inform Phone Y when Phone X performs a local call hold of call#1 without intervention of, or informing, the first subscriber network. Because the new call (call#2) is coming via the second subscriber network, the first subscriber network is not aware of the user-initiated call hold on Phone X and cannot inform Phone Y of the change of state for call#1.

Therefore, a solution is needed that permits informing a second communication device (Phone Y) operating on a first subscriber network when a call hold of a communication session (call#1) occurs that is not initiated by, and/or notified to, the first subscriber network.

SUMMARY

A first aspect provides method operational at a first communication device for implementing a local call hold. A first voice call is established with a second communication device via a first communication network. An indication of a second voice call may be received from a third communication device via a second communication network. The first voice call may then be placed on hold by sending a call hold indicator within a regularly transmitted frame to the second communication device. In one example, the regularly transmitted frame is a Silence Insertion Descriptor (SID) frame. In another example, the regularly transmitted frame is sent only while the first voice call is active via the first communication network. The first voice call may be placed on hold without notifying the first communication network. The second voice call may then be established with the third communication device after placing the first voice call on hold. The first voice call may be associated with a first subscriber identity of the first communication device and the second voice call may be associated with a second subscriber identity of the first communication device. The first voice call with the second communication device may be resume by excluding the call hold indicator from the regularly transmitted frame to the second communication device.

In one example, the first communication network and second communication network may be distinct networks implementing distinct wireless communication technologies. In various implementations, the first voice call and the second voice call may be associated with at least one of: different wireless service providers, different subscriber networks, and different telephone numbers.

A second aspect provides a first communication device comprising a wireless communication circuit coupled to a processing circuit. The wireless communication circuit may be adapted to communicate over two or more types of wireless communication networks. The processing circuit adapted to: (a) establish a first voice call with a second communication device via a first communication network; (b) receive an indication of a second voice call from a third communication device via a second communication network; (c) place the first voice call on hold by sending a call hold indicator within a regularly transmitted frame to the second communication device; and/or (d) establish the second voice call with the third communication device after placing the first voice call on hold, and/or (e) resume the first voice call with the second communication device by excluding the call hold indicator from the regularly transmitted frame to the second communication device. The first voice call may be associated with a first subscriber identity of the first communication device and the second voice call may be associated with a second subscriber identity of the first communication device. The first communication network and second communication network may be distinct networks implementing distinct wireless communication technologies. The regularly transmitted frame may be a Silence Insertion Descriptor (SID) frame.

A third aspect provides a method operational at a second communication device for learning of a local call hold at a first communication device. A first voice call may be established with the first communication device via a first communication network. A call hold indicator may be subsequently received within a regularly transmitted frame from the first communication device. The regularly transmitted frame may be monitored to determine the absence of the call hold indicator. When received, a call hold indicator may be displayed in the second communication device while the call hold indicator is received. The first voice call with the first communication device may be resumed upon identifying the absence of the call hold indicator from the regularly transmitted frame. The regularly transmitted frame may be sent only while the first voice call via the first subscriber network is alive. The regularly transmitted frame may be a Silence Insertion Descriptor (SID) frame. The regularly transmitted frame may be sent only while the first voice call is active via the first communication network.

A fourth aspect provides a second communication device, comprising a communication circuit coupled to a processing circuit. The communication circuit may be adapted to communicate over at least one communication network. The processing circuit adapted to: (a) establish a first voice call with a first communication device via a first communication network; (b) receive a call hold indicator within a regularly transmitted frame from the first communication device; (c) monitor the regularly transmitted frame to determine the absence of the call hold indicator; and/or (d) resume the first voice call with the first communication device upon identifying the absence of the call hold indicator from the regularly transmitted frame. A display device may be coupled to the processing circuit, and the processing circuit may be further adapted to display a call hold indicator in the display device while the call hold indicator is received. The regularly transmitted frame may be sent only while the first voice call via the first subscriber network is alive. The regularly transmitted frame may be a Silence Insertion Descriptor (SID) frame. The regularly transmitted frame may be sent only while the first voice call is active via the first communication network.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Overview

A first feature provides for a mechanism to inform a second communication device when an active call with a first communication device via a first communication network has been placed on hold by the first communication device and without the knowledge of, or informing, the first communication network. To do this, the first communication device inserts and transmits a call hold indicator within a regularly transmitted frame (e.g., Silence Insertion Descriptor (SID) frame) over the first subscriber network while it switches and maintains a second call with a third communication device via a second communication network.

Exemplary Operating Communication Network Environment

Figure 1:
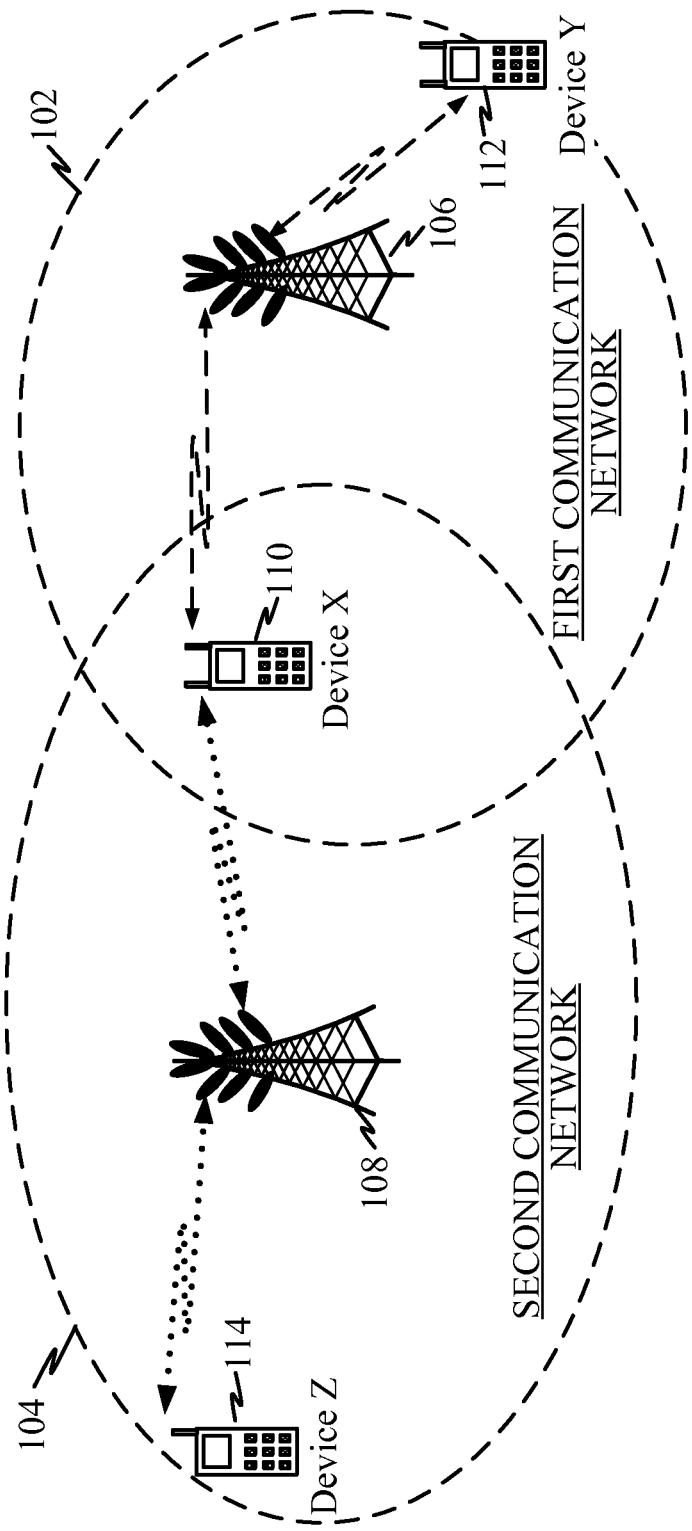
FIG. 1 illustrates a first exemplary communication network environment in which a user-initiated voice call hold may be implemented.

FIG. 1 illustrates a first exemplary communication network environment in which a user-initiated voice call hold may be implemented. This example illustrates a first communication network 102 having a first access point 106 through which wireless communication service is provided according to a first wireless communication technology. Similarly, a second communication network 104 may have a second access point 108 through which wireless communication service is provided according to a second wireless communication technology distinct from the first wireless communication technology.

A first communication device (Device X) 110 may be adapted for dual SIM dual active (DSDA) operation, where the Device X 110 may receive two subscriber identity/identification modules (SIM). In DSDA operation, SIMs may be able to receive calls in idle mode. Once an active call is established on one SIM, a call indication can still be received on another SIM. The operator/user of Device X 110 may switch between the two calls without disconnecting either one of them. In one example, the dual SIMs may be associated with different wireless service providers, different subscriber networks, and/or different phone numbers.

For example, Device X 110 may establish a first call with a second communication device (Device Y) 112 over the first communication network 102 via the first access point 106. During the first call, Device X 110 may receive a second call from a third communication device (Device Z) 114 over the second communication network 104 via the second access point 108. Device X 110 may then initiate a hold of the first call with Device Y 112 by notifying Device Y 112 but without the knowledge, management, and/or intervention by either the first or second communication networks 102 and 104.

In various examples, Device X 110 may be a mobile phone or wireless phone. Devices Y 112 and Z 114 may each be a mobile phone, wireless phone, landline phone, voice-over-IP phone, computing device with voice call capabilities, etc.

Figure 2:
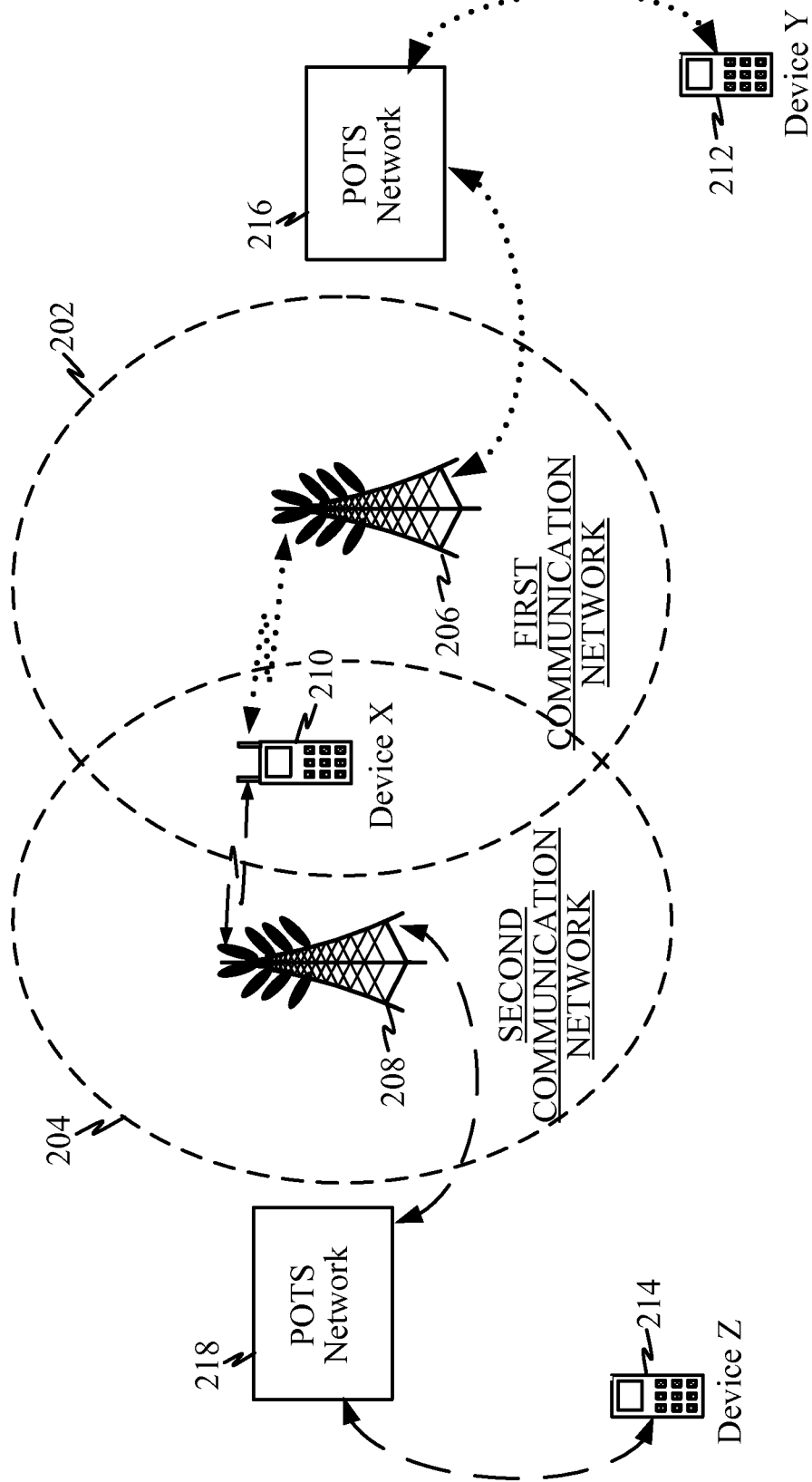
FIG. 2 illustrates a second exemplary communication network environment in which one or more user-initiated voice call hold may be implemented.

FIG. 2 illustrates a second exemplary communication network environment in which one or more user-initiated voice call hold may be implemented. This example illustrates a first communication network 202 having a first access point 206 through which wireless communication service is provided according to a first wireless communication technology. Similarly, a second communication network 204 may have a second access point 208 through which wireless communication service is provided according to a second wireless communication technology distinct from the first wireless communication technology.

In this example, a Device X 210, adapted for DSDA operation, may establish a first call with a second communication device (Device Y) 212 over the first communication network 202 via the first access point 206 and a plain old telephone service (POTS) network 216. During the first call, Device X 210 may receive a second call from a third communication device (Device Z) 214 over the second communication network 204 via a second access point 208 and a plain old telephone service (POTS) network 218. Device X 210 may then initiate a hold of the first call with Device Y 212 by notifying Device Y 212 but without the knowledge, management, and/or intervention by either the first or second communication networks 202 and 204.

It should be noted that FIGS. 1 and 2 are merely two examples of many possible different communication network environment configurations in which a user-initiated call hold from a DSDA device may be performed. For instance, in some examples, the access points may be collocated on a single location and/or the communication networks may be co-extensive in coverage, but the first wireless communication technology used by the first communication network is still distinct from the second wireless communication technology used by the second communication network. In other instances, Device Y may be a wireless device while Device Z may be a landline device, or vice versa. In yet other instances, the first and second communication networks may both be wireless subscriber networks. In an alternative configuration, one of the first or second communication networks may a wireless subscriber networks while the other communication network may be a wireless non-subscriber network.

Figure 3:
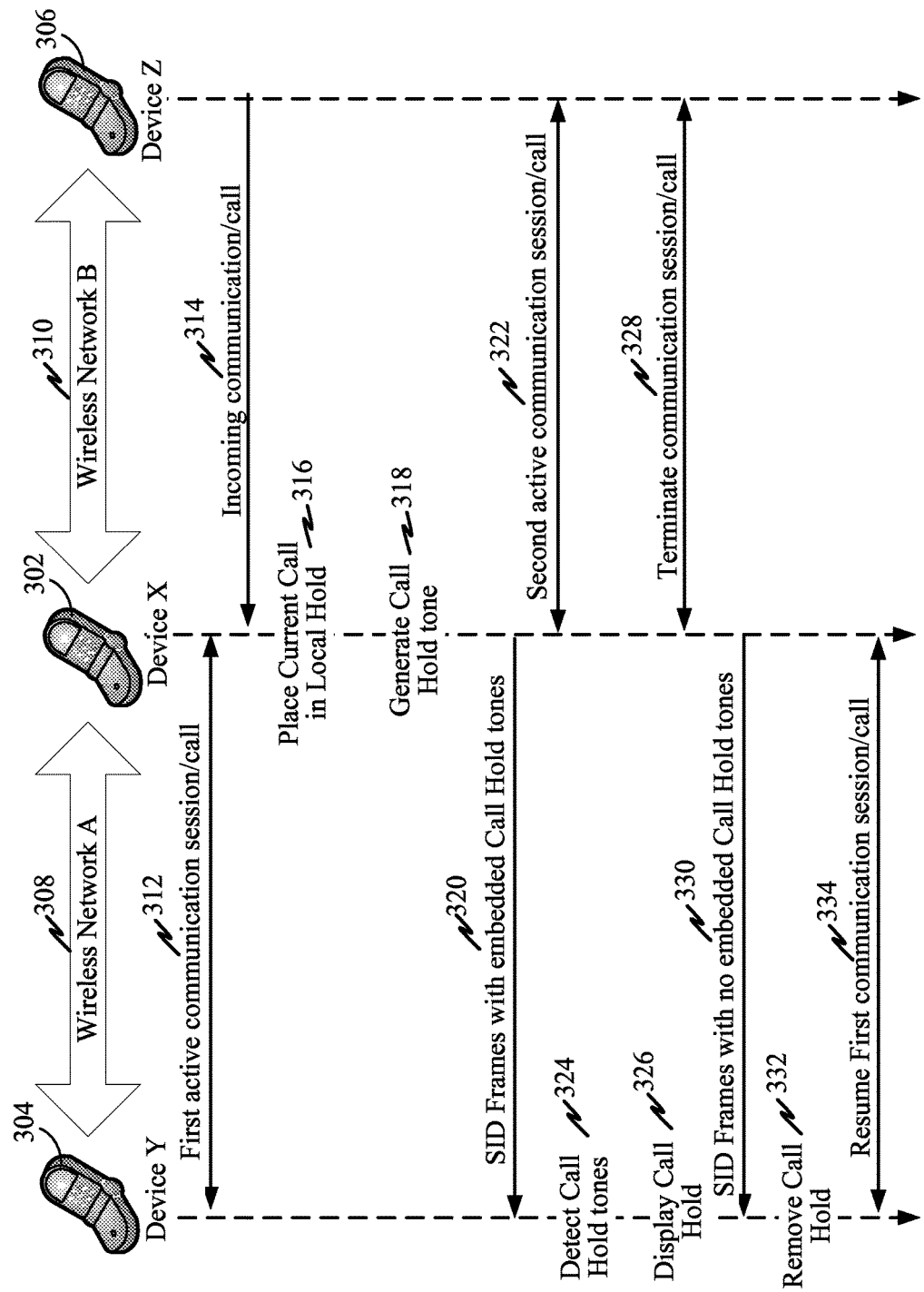
FIG. 3 illustrates how a local call hold may be implemented to allow informing a device on a different communication network to be notified.

FIG. 3 illustrates how a local call hold may be implemented to allow informing a device on a different communication network to be notified. A first communication device (Device X) 302 may have multi-network communication capabilities, e.g., dual SIM dual active (DSDA), such that it may communicate over two or more networks. The first communication device (Device X) 302 may have a first subscription (Sub#1) for wireless service via a first wireless network A 308 and a second subscription (Sub#2) for wireless service via a second wireless network B 310. A second communication device (Device Y) 304 and/or a third communication device (Device Z) 306 may or may not have multiple wireless service subscriptions and they may or may not be directly coupled to either the first wireless network A 308 and second wireless network B 310. For instance, Device Y 304 and/or Device Z 306 may couple to a POTS network, a different third wireless network, and/or another communication network.

Device X 302 and Device Y 304 may have an established communication session/call. For instance, Device X 302 may use a first subscription#1 (Sub#1) over the first wireless network A 308 (e.g., WCDMA network) to establish and/or maintain a first active session/call 312 with Device Y 304. During the active session/call between Device X 302 and Device Y 304, Device X 302 may receive an incoming/terminating session or voice call 314 on the second subscription#2 (Sub#2) over the second wireless network B 310 (e.g., GSM network). Device X 302 may accept the session/call from Device Z 306, while placing the active session/call with Device Y 304 on local hold 316.

Many communication protocols used for voice communications include mechanism for inserting noise into a voice call. If a voice transmission is stopped, and the call or link goes quiet because no speech is being transmitted, the receiving side might assume that the call or link has been terminated or dropped. By inserting comfort noise (e.g., digitally simulated hiss or analog background noise) during periods of silence, the receiving side is assured that the call or link is still active and operational.

In order to inform Device Y 304 that the active call has been placed on hold and has not been dropped, Device X 302 may generate a Call Hold tone (i.e., not DTMF) 318. In one example, this Call Hold tone may be sent in-band along with, or as part of, one or more inserted noise frames sent to Device Y 304.

In one example, the Call Hold tone may be sent by Device X 302 as part of a Silence Insertion Descriptor (SID) frame 320 specified in the G.729.1 Real-time Transport Protocol (RTP) Payload for Comfort Noise. SID frames may be typically transmitted by Device X 302 to Device Y 304, in-band, while the session/call is alive (either active or on hold). Device Y 304 detects the Call Hold tones 324 and may display an indication "Call Hold" 326 in the user interface/screen of Device Y 304. This may just be a notification to the user/operator of Device Y 304 with no response being solicited. Device Y 304 may continue to monitor the SID frames (which are transmitted periodically by Device X 302) to ascertain when the local hold is removed 332. That is, the Call Hold tones may be sent by Device X 302 as long as the call is on local hold at Device X 302.

Once Device X 302 places the call on local hold 316, it may then accept and maintain a second active communication session/call 322 with Device Z 306, via the second subscription (Sub#2) over the wireless network B 310. Once Device X 302 ends the second active communication session/call 322 with Device Z 306, it may stop sending the Call Hold tones within the SID frames 330, causing Device Y 304 to remove the call hold 332, and the first communication session/call between Device X 302 and Device Y 304 can resume 334.

Exemplary Call-Hold Initiator Device

Figure 4:
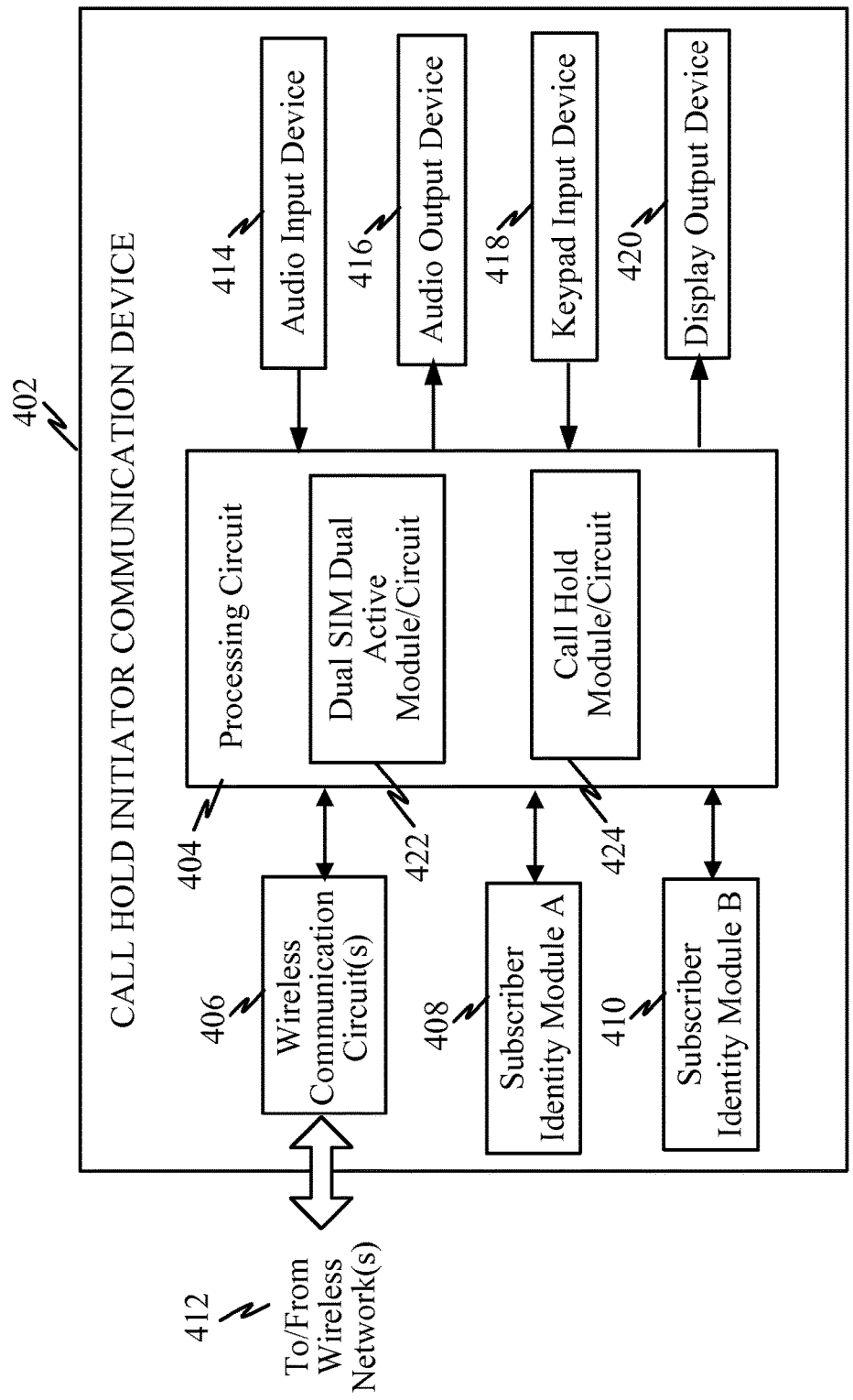
FIG. 4 is a block diagram illustrating a communication device having dual SIM dual active (DSDA) capabilities and adapted to initiate a call hold without assistance or management by an intermediary communication network.

FIG. 4 is a block diagram illustrating a communication device 402 having dual SIM dual active (DSDA) capabilities and adapted to initiate a call hold without assistance or management by an intermediary communication network. The communication device 402 may include a processing circuit 402 coupled to a wireless communication circuit 406, a first subscriber identity module (SIM) A 408, a second subscriber identity module (SIM) B 410, an audio input device 414 (e.g., one or more microphones), an audio output device 416 (e.g., one or more audio speakers), a keypad input device 418, and/or a display output device 420. The wireless communication circuit 406 may permit communications over two or more distinct wireless communication/subscriber networks 412 as specified by the first SIM A 408 and/or the second SIM B 410.

The processing circuit 404 may include a dual SIM, dual active module or circuit 422 that allows the communication device 402 to use both SIMs concurrently. This may allow the communication device 402 to make and/or receive calls via distinct wireless subscriber accounts, phone numbers, and/or wireless subscriber/communication networks (e.g., utilizing distinct wireless technologies and/or protocols). For example, once an active call is established on the first SIM A 408, a call indication can still be received on the second SIM B 410, thereby allowing the communication device to accept a new call (via the second SIM B 410) while placing an existing call (via the first SIM A 408) on hold. The first SIM A 408 and second SIM B 410 may be integrated with the communication device 402 or they may be separate modules that are plugged into an interface or slot in the communication device 402.

Figure 5:
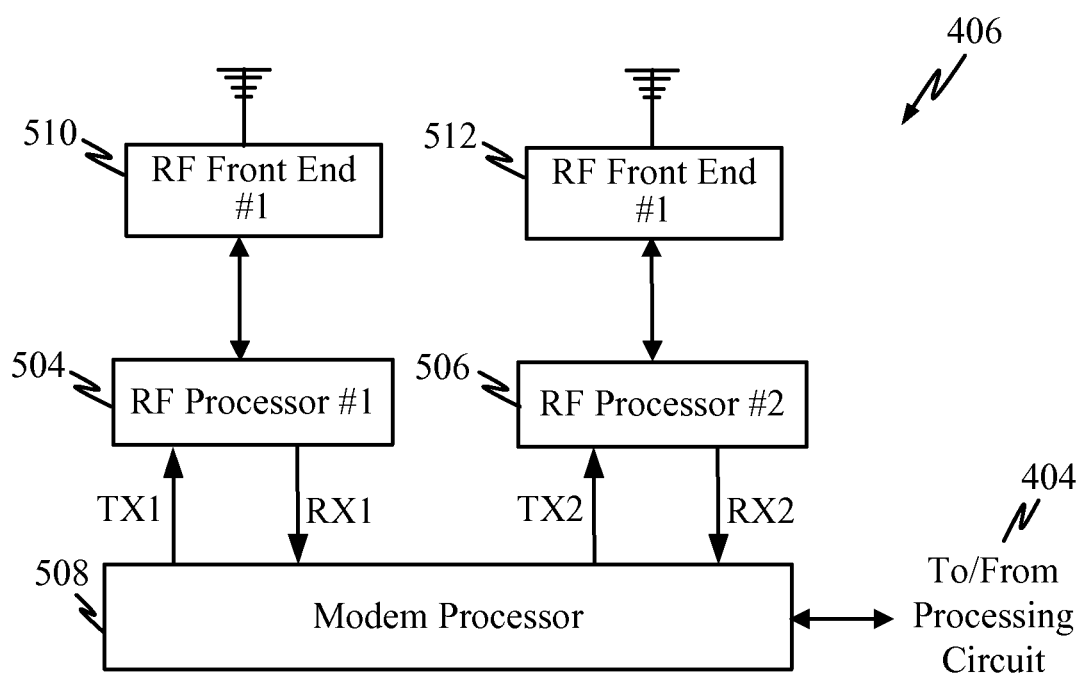
FIG. 5 is a block diagram illustrating an example of the wireless communication circuit of the communication device in FIG. 4.

FIG. 5 is a block diagram illustrating an example of the wireless communication circuit 406 of the communication device 402. In this example, at least two transceiver chains may be implemented that can be concurrently active. For instance, the wireless communication circuit 406 may include a first and a second radio frequency (RF) processors 504 and 506 coupled to a first radio frequency front end (interface) 510 and second radio frequency front end (interface) 512, respectively. Both the first and second radio frequency processors 504 and 506 may be coupled to a modem processor 508. A first transceiver chain may include the first radio RF processor 504 and the first RF front end 510. A second transceiver chain may include the second radio RF processor 506 and the second RF front end 512.

Consequently, the communication device 402 may be able to communicate over a first wireless communication/subscriber network (via the first frequency radio front 510) and concurrently over a second wireless communication/subscriber network (via the second frequency radio front end 512).

Referring again to FIG. 4, the processing circuit 402 may include or implement a dual SIM dual active module/circuit 422 that permits the communication device 402 to establish and/or maintain communication sessions/calls associated with one or both SIMs A and B 408 and 410. In one example, the communication device 402 may be able to receive calls for both SIMs 408 and 410 in idle mode. Once an active call is established for one SIM, a call indication can still be received on the other SIM. A user/operator may switch between two calls without disconnecting either one of them. Additionally, the processing circuit 402 may include or implement a call hold module/circuit 424 adapted to send a call hold indictor to a recipient on an existing call associated with the first SIM 408 when a new call associated with the second SIM 410 is received.

Figure 6:
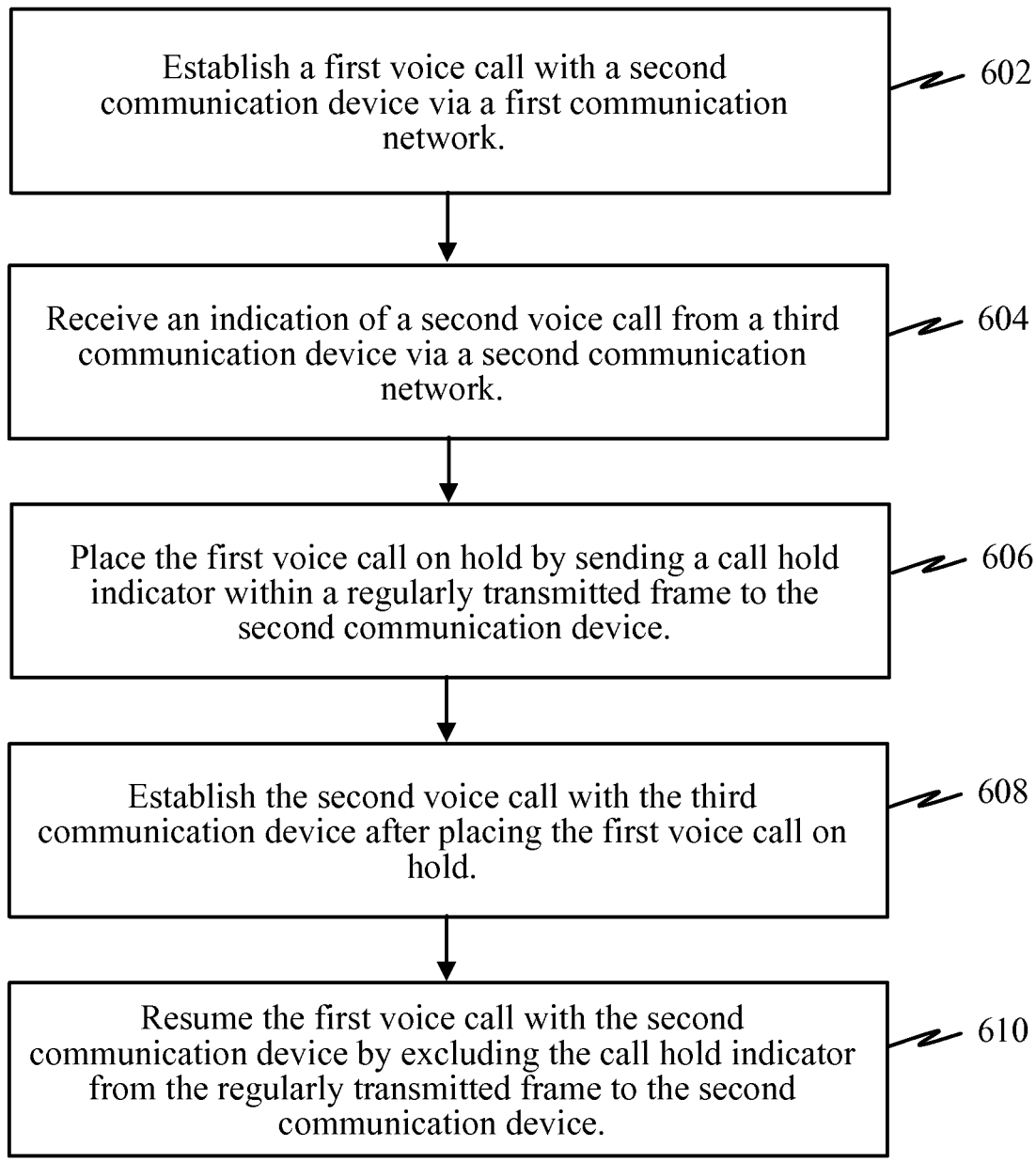
FIG. 6 is a flow diagram illustrating a method operational by a call hold initiator communication device for implementing a local call hold.

FIG. 6 is a flow diagram illustrating a method operational by a call hold initiator communication device for implementing a local call hold. A first voice call (e.g., first communication session) may be established with a second communication device via a first communication network 602. In one example, the first communication network may be associated with a first wireless subscription, a first phone number, and/or a first wireless subscriber network. An indication of a second voice call (e.g., second communication session) may be received from a third communication device via a second communication network 604. That is, while the first communication device has an active first phone call, the third communication device may seek to initiate the second voice call via second communication network that is distinct from the first communication network. For example, the first and second communication networks (e.g., wireless networks) may be operated by different service providers, may implement incompatible wireless communication technologies, and/or may implement distinct communication protocols. Additionally, the first and second communication networks may work independent of each other and may not have knowledge that concurrent voice calls are occurring over the first and second communication networks for the same first communication device.

The first voice call may be placed on hold (by the first communication device), by sending a call hold indicator within a regularly transmitted frame to the second communication device 606. In one example, such "hold" may mean that a communication link over the first communication network is kept alive so that it can be resumed at a later time. In one example, the regularly transmitted frame may be a noise insertion frame, like a Silence Insertion Descriptor (SID) frame. The regularly transmitted frame may be sent (once or multiple times) only while the first voice call, via the first communication network, is alive. The second voice call may be established with the third communication device after placing the first voice call on hold 608. The first voice call with the second communication device may be resumed by excluding the call hold indicator from the regularly transmitted frame to the second communication device 610.

Exemplary Call-Hold Recipient Device

Figure 7:
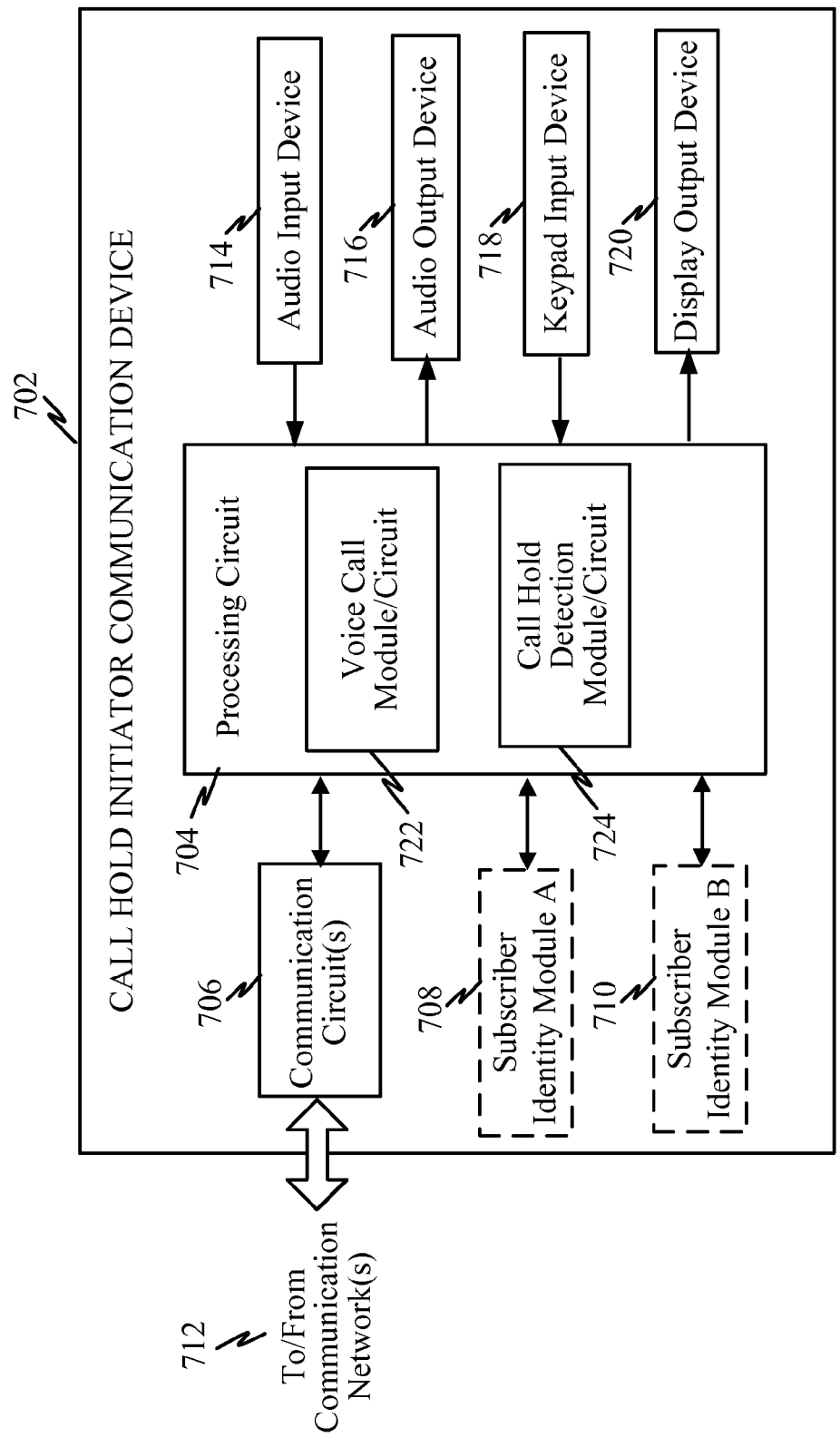
FIG. 7 is a block diagram illustrating a communication device adapted to receive a local call hold.

FIG. 7 is a block diagram illustrating a communication device 702 adapted to receive a local call hold. The communication device 702 may include a processing circuit 702 coupled to a wired/wireless communication circuit 706, optionally a first subscriber identity module (SIM) A 708, optionally a second subscriber identity module (SIM) B 710, an audio input device 714 (e.g., one or more microphones), an audio output device 716 (e.g., one or more audio speakers), a keypad input device 718, and/or a display output device 720. The communication circuit 706 may permit voice communications over at least one communication network 712 (e.g., wireless network, POTS network, etc.). The processing circuit 704 may include or implement a voice call module/circuit 722 that permits initiating a voice call, accepting a voice call, and/or maintaining a voice call. Additionally, a call hold detection module/circuit 724 may serve to detect when a user-initiated call hold is received and removed/cleared for an active voice call, thereby allowing the communication device 702 and/or user/operator thereof to know when a call hold has been placed versus when a call has been terminated or dropped.

Figure 8:
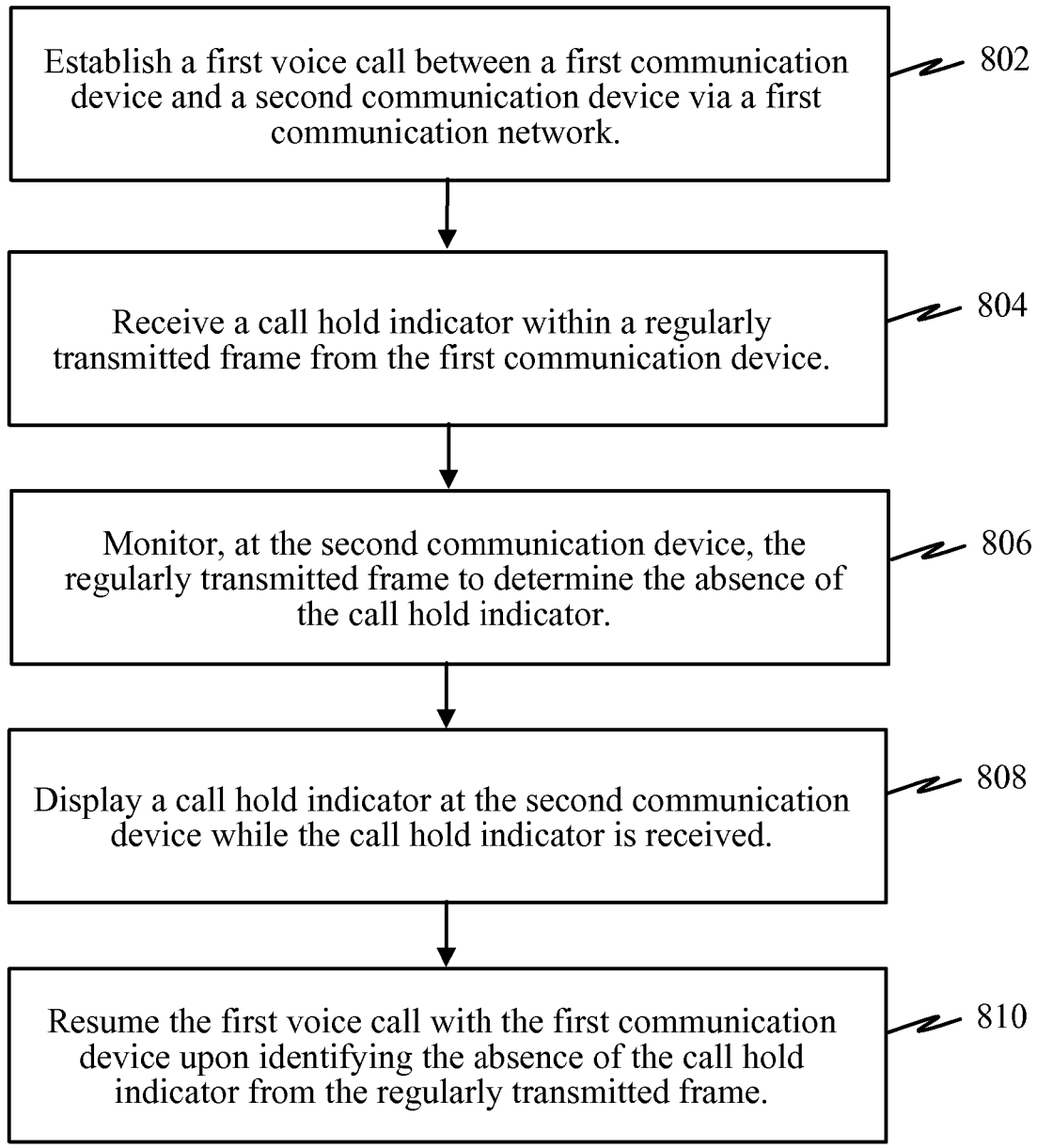
FIG. 8 illustrates a method operational by a call hold recipient communication device for implementing a local call hold.

FIG. 8 illustrates a method operational by a call hold recipient communication device for implementing a local call hold. A first voice call is established between a first communication device and a second communication device via a first subscriber network 802. The second communication device may (subsequently) receive a call hold indicator within a regularly transmitted frame from the first communication device 804. Consequently, the second communication device may monitor the regularly transmitted frame to determine the absence of the call hold indicator 806. The second communication device may also display a call hold indicator in the second communication device while the call hold indicator is received 808. The first voice call with the first communication device may be resumed upon identifying the absence of the call hold indicator from the regularly transmitted frame 810.

One or more of the components, steps, features and/or functions illustrated in the Figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational by a first communication device for implementing a local call hold, comprising:
   establishing, by the first communication device, a first voice call with a second communication device via a first communication network;
   receiving, by the first communication device, an indication of a second voice call from a third communication device via a second communication network; and
   placing the first voice call on hold in the first communication device and sending a call hold indicator at least in band with a regularly transmitted frame related to inserted noise from the first communication device to the second communication device to indicate to the second communication device that the first voice call is on hold; and
   establishing the second voice call with the third communication device after placing the first voice call on hold.

2. The method of claim 1, wherein the first voice call is associated with a first subscriber identity of the first communication device and the second voice call is associated with a second subscriber identity of the first communication device.

3. The method of claim 1, wherein the first communication network and second communication network are distinct networks implementing distinct wireless communication technologies.

4. The method of claim 1, wherein the first voice call and the second voice call are associated with at least one of: different wireless service providers, different subscriber networks, and different telephone numbers.

5. The method of claim 1, further comprising:
   resuming the first voice call with the second communication device by excluding the call hold indicator from the regularly transmitted frame to the second communication device.

6. The method of claim 1, wherein the regularly transmitted frame is a Silence Insertion Descriptor (SID) frame.

7. The method of claim 1, wherein the regularly transmitted frame is sent only while the first voice call is active via the first communication network.

8. The method of claim 1, wherein the first voice call is placed on hold without notifying the first communication network.

9. A first communication device, comprising:
   a wireless communication circuit adapted to communicate over two or more types of wireless communication networks; and
   a processing circuit coupled to the wireless communication circuit, the processing circuit adapted to establish, by the first communication device, a first voice call with a second communication device via a first communication network;
   receive, by the first communication device, an indication of a second voice call from a third communication device via a second communication network; and
   place the first voice call on hold in the first communication device and sending a call hold indicator at least in band with a regularly transmitted frame related to inserted noise from the first communication device to the second communication device to indicate to the second communication device that the first voice call is on hold; and establish the second voice call with the third communication device after placing the first voice call on hold.

10. The first communication device of claim 9, wherein the first voice call is associated with a first subscriber identity of the first communication device and the second voice call is associated with a second subscriber identity of the first communication device.

11. The first communication device of claim 9, wherein the first communication network and second communication network are distinct networks implementing distinct wireless communication technologies.

12. The first communication device of claim 9, wherein the processing circuit is further adapted to:
resume the first voice call with the second communication device by excluding the call hold indicator from the regularly transmitted frame to the second communication device.

13. The first communication device of claim 9, wherein the regularly transmitted frame is a Silence Insertion Descriptor (SID) frame.

14. A first communication device, comprising:
means for establishing, by the first communication device, a first voice call with a second communication device via a first communication network;
means for receiving, by the first communication device, an indication of a second voice call from a third communication device via a second communication network; and
means for placing the first voice call on hold in the first communication device and sending a call hold indicator at least in band with a regularly transmitted frame related to inserted noise from the first communication device to the second communication device to indicate to the second communication device that the first voice call is on hold; and
means for establishing the second voice call with the third communication device after placing the first voice call on hold.

15. The first communication device of claim 14, wherein the first voice call is associated with a first subscriber identity of the first communication device and the second voice call is associated with a second subscriber identity of the first communication device.

16. The first communication device of claim 14, further comprising:
means for resuming the first voice call with the second communication device by excluding the call hold indicator from the regularly transmitted frame to the second communication device.

17. The first communication device of claim 14, wherein the regularly transmitted frame is a Silence Insertion Descriptor (SID) frame.

18. A non-transitory processor-readable storage medium having one or more instructions operational in a first communication device, which when executed by one or more processors causes the one or more processors to:
establish, by the first communication device, a first voice call with a second communication device via a first communication network;
receive, by the first communication device, an indication of a second voice call from a third communication device via a second communication network; and
place the first voice call on hold in the first communication device and sending a call hold indicator at least in band with a regularly transmitted frame related to inserted noise from the first communication device to the second communication device to indicate to the second communication device that the first voice call is on hold; and
establish the second voice call with the third communication device after placing the first voice call on hold.

19. The non-transitory processor-readable storage medium of claim 18, wherein the first voice call is associated with a first subscriber identity of the first communication device and the second voice call is associated with a second subscriber identity of the first communication device.

20. The non-transitory processor-readable storage medium of claim 18, wherein the first communication network and second communication network are distinct networks implementing distinct wireless communication technologies.

21. The non-transitory processor-readable storage medium of claim 18, further comprising one or more instructions which when executed by the one or more processors causes the one or more processors to:
resume the first voice call with the second communication device by excluding the call hold indicator from the regularly transmitted frame to the second communication device.

22. A method operational at a second communication device for learning of a local call hold at a first communication device, comprising:
establishing, by the second communication device, a first voice call with the first communication device via a first communication network;
receiving, by the second communication device, a call hold indicator at least in band with a regularly transmitted frame related to inserted noise from the first communication device to indicate to the second communication device that the first voice call is on hold; and
monitoring, by the second communication device, the regularly transmitted frame to determine the absence of the call hold indicator; and
resuming the first voice call with the first communication device upon identifying the absence of the call hold indicator from the regularly transmitted frame.

23. The method of claim 22, further comprising:
displaying the call hold indicator in the second communication device while the call hold indicator is received.

24. The method of claim 22, wherein the regularly transmitted frame is sent only while the first voice call via the first subscriber network is alive.

25. The method of claim 22, wherein the regularly transmitted frame is a Silence Insertion Descriptor (SID) frame.

26. The method of claim 22, wherein the regularly transmitted frame is sent only while the first voice call is active via the first communication network.

27. A second communication device, comprising:
a communication circuit adapted to communicate over at least one communication network; and
a processing circuit coupled to the communication circuit, the processing circuit adapted to establish, by the second communication device, a first voice call with a first communication device via a first communication network;
receive, by the second communication device, a call hold indicator at least in band with a regularly transmitted frame related to inserted noise from the first communication device to indicate to the second communication device that the first voice call is on hold; and monitor, by the second communication device, the regularly transmitted frame to determine the absence of the call hold indicator; and resume the first voice call with the first communication device upon identifying the absence of the call hold indicator from the regularly transmitted frame.

28. The second communication device of claim 27, further comprising:

a display device coupled to the processing circuit, wherein the processing circuit is further adapted to display the call hold indicator in the display device while the call hold indicator is received.

29. The second communication device of claim 27, wherein the regularly transmitted frame is sent only while the first voice call via the first subscriber network is alive.

30. The second communication device of claim 27, wherein the regularly transmitted frame is a Silence Insertion Descriptor (SID) frame.

31. The second communication device of claim 27, wherein the regularly transmitted frame is sent only while the first voice call is active via the first communication network.

32. A second communication device, comprising:

means for establishing, by the second communication device, a first voice call with the first communication device via a first communication network;

means for receiving, by the second communication device, a call hold indicator at least in band with a regularly transmitted frame related to inserted noise from the first communication device to indicate to the second communication device that the first voice call is on hold; and means for monitoring, by the second communication device, the regularly transmitted frame to determine the absence of the call hold indicator; and means for resuming the first voice call with the first communication device upon identifying the absence of the call hold indicator from the regularly transmitted frame.

33. The second communication device of claim 32, further comprising:

means for displaying the call hold indicator in the second communication device while the call hold indicator is received.

34. A non-transitory processor-readable storage medium having one or more instructions operational in a second communication device, which when executed by one or more processors causes the one or more processors to:

establish, by the second communication device, a first voice call with a first communication device via a first communication network;

receive, by the second communication device, a call hold indicator at least in band with a regularly transmitted frame related to inserted noise from the first communication device to indicate to the second communication device that the first voice call is on hold; and monitor, by the second communication device, the regularly transmitted frame to determine the absence of the call hold indicator; and resume the first voice call with the first communication device upon identifying the absence of the call hold indicator from the regularly transmitted frame.

35. The non-transitory processor-readable storage medium of claim 34, further comprising one or more instructions which when executed by the one or more processors causes the one or more processors to:

display the call hold indicator in the second communication device while the call hold indicator is received.

36. The method of claim 1, wherein the call hold indicator enables the second communication device to detect that a call hold has been placed.

* * * * *